(12) United States Patent
Huang et al.

(10) Patent No.: US 12,461,174 B2
(45) Date of Patent: Nov. 4, 2025

(54) CROSS-SHAPED HIGH-TEMPERATURE THREE-DIMENSIONAL HALL SENSOR AND PREPARATION METHOD THEREOF

(71) Applicant: DALIAN UNIVERSITY OF TECHNOLOGY, Dalian (CN)

(72) Inventors: Huolin Huang, Dalian (CN); Kaiming Ma, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 203 days.

(21) Appl. No.: 18/534,977

(22) Filed: Dec. 11, 2023

(65) Prior Publication Data
US 2024/0192290 A1    Jun. 13, 2024

(30) Foreign Application Priority Data
Dec. 9, 2022    (CN) .......................... 202211580260.1

(51) Int. Cl.
*G01R 33/02*   (2006.01)
*G01R 33/00*   (2006.01)
*G01R 33/07*   (2006.01)

(52) U.S. Cl.
CPC ......... *G01R 33/07* (2013.01); *G01R 33/0076* (2013.01); *G01R 33/0206* (2013.01)

(58) Field of Classification Search
CPC ........................... G01R 33/0206; G01R 33/07
See application file for complete search history.

(56) References Cited

FOREIGN PATENT DOCUMENTS

CN    111682104    *    9/2020

* cited by examiner

*Primary Examiner* — Alesa Allgood
(74) *Attorney, Agent, or Firm* — HAUPTMAN HAM, LLP

(57) ABSTRACT

A cross-shaped high-temperature three-dimensional Hall sensor includes the X column, the Y column and the Z column all made of third-generation semiconductor materials. The X column, the Y column and the Z column are vertically connected to each other. An electrode C1 and an electrode C2 are respectively arranged at two ends of the Z column. An electrode C3 and an electrode C4 are respectively arranged at two sides of the Y column. An electrode C5 and an electrode C6 are respectively arranged at two sides of the X column. The current description uses the excellent high temperature performance of the third generation semiconductor to make the sensor work in the high temperature environment, the new structure greatly reduces the volume compared with the other device packaging combined Hall sensor, and makes the sensor work in very narrow space.

6 Claims, 4 Drawing Sheets

1. Material Preparation

2. Structure Etching

3. Device Isolation

4. Electrode Fabrication

5. Surface Passivation

6. Window Opening

CROSS-SHAPED HIGH-TEMPERATURE THREE-DIMENSIONAL HALL SENSOR AND PREPARATION METHOD THEREOF

RELATED APPLICATIONS

The present application claims priority from Chinese Application Number 202211580260.1, filed Dec. 9, 2022, the disclosure of which is hereby incorporated by reference herein in its entirety.

TECHNICAL FIELD

The present invention belongs to the field of semiconductor device technology, particularly involving a cross-shaped high-temperature three-dimensional Hall sensor and preparation method thereof.

BACKGROUND TECHNOLOGY

Hall sensors are the most widely used and market-dominant type of magnetic sensors. They are capable of measuring the magnitude of the magnetic field and other related physical quantities, such as displacement, flow, and rotation speed. Hall sensors are known for their high accuracy, low power consumption, low cost, and wide measurement range, making them extensively applied in various fields, including biomedicine, automotive electronics, aerospace, and industrial production. Traditional Hall sensors are mostly made from semiconductor materials like silicon (Si), gallium arsenide (GaAs), indium antimonide (InSb), and indium arsenide (InAs). However, these materials have small bandgaps and limited tolerance to high temperatures, restricting their operation to environments below 150° C. In high-temperature settings, the scattering mechanisms of these materials can significantly impact their performance, rendering the sensors unable to function properly. For applications such as downhole equipment and current detection in spacecraft, where magnetic sensors need to operate reliably at temperatures exceeding 200° C., there is a demand for sensors that can withstand extreme conditions. Third-generation semiconductor materials, such as gallium nitride (GaN), silicon carbide (SiC), zinc oxide (ZnO), and diamond, have wider bandgaps and greater tolerance to high temperatures. Hall sensors fabricated with third-generation semiconductor materials can operate stably even in high-temperature environments of up to 400° ° C., meeting the requirements for measurements in harsh conditions.

Hall sensors are generally divided into two types: horizontal structures, which detect the magnitude of a magnetic field perpendicular to the sensor surface, and vertical structures, which detect the magnitude of a magnetic field parallel to the sensor surface. While single devices can meet certain testing requirements, many applications demand the measurement of a three-dimensional magnetic field, such as in automotive navigation and the localization of magnetic markers in the human body. Currently, there are two main methods for achieving three-dimensional magnetic field measurements. The first method involves encapsulating devices that measure a magnetic field in a single direction using packaging technology, in a manner that allows for the measurement of magnetic fields in the X, Y, and Z directions. This approach enables the measurement of a three-dimensional magnetic field, with consistent sensitivity in all three directions and relatively simple wiring. However, this method requires a larger number of devices, resulting in a larger sensor volume, and demands higher precision in encapsulation. The second method integrates a horizontal sensor with two vertical sensors. This approach results in a smaller sensor size and higher integration, but it comes with the drawback of complex wiring. Additionally, the sensitivities and temperature coefficients of the sensors in the three directions may be inconsistent.

The existing technology for fabricating Hall sensors is primarily based on materials such as Si, GaAs, InSb, and InAs, which cannot operate reliably in environments exceeding 150° C. However, in many harsh environments, such as nuclear power plants, underground applications, or space, there is a need for sensors to operate at temperatures exceeding 200° C. for the measurement of magnetic fields or related quantities.

The existing methods for measuring a three-dimensional magnetic field with Hall sensor technology primarily involve two approaches. The first method entails encapsulating horizontal or vertical Hall sensors, which measure magnetic fields in a single direction, through packaging technology. However, this method has drawbacks, including: 1) the need for at least three horizontal or vertical sensors for encapsulation, increasing production costs; 2) high encapsulation difficulty, demanding precision and a larger number of leads; 3) Since at least three devices are required and they need to be positioned in three dimensions, the sensor's volume is relatively large and challenging to reduce. However, many application scenarios demand extremely compact sensor sizes, such as the detection of magnetic labels in human blood vessels for medical diagnosis. The second method combines or integrates horizontal and vertical Hall sensors. It utilizes horizontal sensors to measure the magnitude of a magnetic field perpendicular to the sensor surface and vertical sensors to measure the magnitudes of two parallel magnetic fields on the sensor surface. While this method partially addresses the drawbacks of single-device encapsulation, it introduces new challenges: 1) the integration of electrodes for both horizontal and vertical devices on the surface results in a small volume but complex wiring; 2) the short-circuit effect in vertical devices and the asymmetric structure caused by the manufacturing process significantly affect the measurement results, leading to a larger performance gap compared to horizontal devices. Consequently, there are substantial differences in sensitivity, temperature coefficients, and offset voltages during three-dimensional measurements. The inconsistency in performance changes with temperature rise complicates high-temperature applications. Additionally, the disparities in sensitivity and offset voltages require additional processing of measurement results during testing.

SUMMARY OF THE INVENTION

To address the limitations of traditional semiconductor material Hall sensors, which cannot operate in high-temperature environments exceeding 150° C. due to inherent material constraints, the present invention utilizes a Hall sensor fabricated with third-generation semiconductor materials. The wide bandgap of these materials enables stable operation in high-temperature environments exceeding 400° C.

In order to address the issues associated with traditional three-dimensional structures formed by a single combination or integration of multiple horizontal and vertical Hall sensors, leading to challenges such as large sensor size, complex wiring, high encapsulation difficulty, and inconsistent performance parameters across the three directions, the novel three-dimensional cross-shaped measurement structure proposed in this invention aims to overcome these problems. The advantages of this device are as follows: 1) Fabricated with third-generation semiconductor materials, it can operate stably in high-temperature environments exceeding 400° ° C. 2) Utilizing a back electrode structure, the cross-shaped structure is integrated in three directions, enabling a single device to measure magnetic fields in all three directions. This significantly reduces the sensor's size, allowing it to operate in cramped spaces. 3) With a minimal number of electrodes, the integration of three cross-shaped structures into one device requires only six electrodes to accomplish three-dimensional magnetic field measurements, simplifying wiring. 4) The cross-shaped structure enhances the device sensitivity and makes the production of electrodes more convenient. This structure, known for its high sensitivity and low offset voltage in single-direction measurements, maintains these advantages when integrated into the three-dimensional structure, resulting in increased sensitivity and reduced offset voltage. 5) The uniformity of the measurement device structures in all three directions ensures consistent sensitivity, temperature coefficient, and offset voltage parameters, facilitating subsequent signal processing.

The Technical Solution is as Follows:

A high-temperature resistant three-dimensional Hall sensor with a cross-shaped structure, comprising X-column, Y-column, Z-column, electrode C1, electrode C2, electrode C3, electrode C4, electrode C5, and electrode C6. The X-column, Y-column, and Z-column are all made of third-generation semiconductor materials, and the X-column, Y-column, and Z-column are vertically connected to each other. Electrodes C1 and C2 are respectively set at both ends of the Z-column, electrodes C3 and C4 are set on both sides of the Y-column, and electrodes C5 and C6 are set on both sides of the X-column.

Further, the X-column, Y-column, and Z-column form an integral molded structure.

Furthermore, the third-generation semiconductor materials can be any one of gallium nitride, silicon carbide, zinc oxide, or diamond.

Moreover, for detecting the magnetic field Bz perpendicular to the surface formed by electrodes C3, C4, C5, and C6, electrodes C3 and C4 serve as excitation input terminals receiving input voltage or current excitation, while electrodes C5 and C6 detect the output potential difference signal. Or, electrodes C5 and C6 can be used as excitation input terminals receiving input voltage or current excitation, while electrodes C3 and C4 detect the output potential difference signal.

Additionally, when detecting the horizontal direction magnetic field, the magnitude of the By direction magnetic field is measured through electrodes C1, C2, C5, and C6. Electrodes C1, C2, or electrodes C5, C6 serve as excitation input terminals receiving input voltage or current excitation, and the magnitude of the By magnetic field is measured by detecting the potential difference between electrodes C5, C6, or electrodes C1, C2.

Furthermore, the magnitude of the Bx direction magnetic field is measured through electrodes C1, C2, C3, and C4. Electrodes C1, C2, or electrodes C3, C4 serve as excitation input terminals receiving input voltage or current excitation, and the magnitude of the Bx magnetic field is measured by detecting the potential difference between electrodes C3, C4, or electrodes C1, C2.

The present invention further includes a method for preparing a cross-shaped high-temperature three-dimensional Hall sensor, with the following steps:

S1. Material preparation: Prepare third-generation semiconductor materials, clean the materials using acetone, ethanol, deionized water, and hydrochloric acid to remove impurities on the surface of the materials.

S2. Structural etching: After photolithography of the third-generation semiconductor material, use inductively coupled plasma etching equipment to etch the third-generation semiconductor material. Etch both sides to the same depth, preserving the electron-active region.

S3. Device isolation: After photolithography development, use plasma etching or ion implantation to form isolation in the device area.

S4. Electrode fabrication: After photolithography development, deposit composite metal using an electron beam evaporation system. Use rapid thermal annealing to form ohmic contacts on the surface of the third-generation semiconductor material.

S5. Surface passivation: Deposit a dielectric layer for device passivation using any one of electron beam evaporation, magnetron sputtering, plasma-enhanced chemical vapor deposition, or atomic layer deposition.

S6. Window opening: After photolithography development, etch openings in the passivation layer at the electrode locations. Use any of magnetron sputtering, electron beam evaporation, or thermal evaporation methods to deposit metal at the electrode locations, and create solder pads and lead wires.

Further, in Step S1:

Prepare SiC material with an electron concentration of 1e15~1e18 cm$^{-3}$. Perform hydrogen etching to smooth the surface. Clean the substrate using acetone, ethanol, deionized water to remove organic substances. Use hydrochloric acid to remove oxides and metals from the surface. Rinse with deionized water and dry with high-purity nitrogen.

Or,

Prepare GaN material with an electron concentration of 1e16~1e18 cm$^{-3}$. Clean the substrate using acetone, ethanol, deionized water to remove organic substances. Use hydrochloric acid to remove oxides and metals from the surface. Rinse with deionized water and dry with high-purity nitrogen.

Further, in Step S4:

After photolithography development, use an electron beam evaporation system to deposit Ni/Ti/Al metal on the SiC surface. Subsequently, use rapid thermal annealing in a nitrogen environment to form ohmic contacts. Reserve a 2~5 μm margin around the electrode.

Or,

After photolithography development, use an electron beam evaporation system to deposit Ti/Al metal on the GaN surface. Subsequently, use rapid thermal annealing in a nitrogen environment to form ohmic contacts. Reserve a 2~5 μm margin around the electrode.

Further, in Step S5:

Use plasma-enhanced chemical vapor deposition to deposit a SiO$_2$ passivation layer to weaken the influence of the environment on device characteristics.

Or,

Use plasma-enhanced chemical vapor deposition to deposit a Si$_3$N$_4$ passivation layer to weaken the influence of the environment on device characteristics.

The Beneficial Effects of the Present Invention are as Follows:

The cross-shaped high-temperature three-dimensional Hall sensor and preparation method thereof have five main technical advantages: 1) Fabricated with third-generation semiconductor materials, it can operate stably in high-temperature environments exceeding 400° C. 2) Utilizing a back electrode structure, the cross-shaped structure is integrated in three directions, enabling a single device to measure magnetic fields in all three directions. This significantly reduces the sensor's size, allowing it to operate in cramped spaces. 3) With a minimal number of electrodes, the integration of three cross-shaped structures into one device requires only six electrodes to accomplish three-dimensional magnetic field measurements, simplifying wiring. 4) The cross-shaped structure enhances device sensitivity and facilitates electrode fabrication. This structure, known for its high sensitivity and low offset voltage in single-direction measurements, maintains these advantages when integrated into the three-dimensional structure, resulting in increased sensitivity and reduced offset voltage. 5) The uniformity of the measurement device structures in all three directions ensures consistent sensitivity, temperature coefficient, and offset voltage parameters, facilitating subsequent signal processing.

The beneficial effects brought about by the technical solution of the present invention are as follows. On one hand, the outstanding high-temperature performance of third-generation semiconductors allows the sensor to operate in high-temperature environments. On the other hand, the invention proposes a novel structure for a three-dimensional Hall sensor. Compared to traditional discrete device packaging and integrated Hall sensors, this new structure significantly reduces the volume, enabling the sensor to operate in extremely confined spaces. Additionally, the proposed structure exhibits consistent performance in all directions, which is advantageous for high-temperature operation and subsequent signal processing. The highly sensitive Hall sensor produced by this solution holds promising applications in various fields such as micro-wearable devices, nuclear power plants, medicine, military, aerospace, and more.

BRIEF DESCRIPTION OF DRAWINGS

To provide a clearer explanation of the technical solutions in the embodiments of the present invention, the following will present a detailed description by combining diagrams and specific implementation methods. It is evident that the diagrams in the following description are merely some embodiments of the present invention. For those skilled in the art, additional diagrams can be obtained without inventive effort based on these diagrams. Specifically.

EMBODIMENTS

In order to make the objectives, technical solutions, and advantages of the present invention clearer and more understandable, the present invention will be further described in detail below with reference to the accompanying drawings and examples. It should be understood that the specific examples described here are only for explaining the present invention and are not intended to limit the present invention. The following is a detailed explanation of the cross-shaped high-temperature three-dimensional Hall sensor and preparation method thereof with reference to FIGS. 1-5.

The present invention proposes a new type of cross-shaped high-temperature three-dimensional Hall sensor, prepared using third-generation semiconductor materials, suitable for use in high-temperature environments. This type of sensor can measure the three-dimensional magnetic field with a single device, has a small volume, low packaging difficulty, and the measurement structures in three directions are similar. Therefore, the performance of the device in the three-dimensional directions is almost consistent, making wiring easy, and combining the advantages of two traditional methods in the background art.

Figure 1:
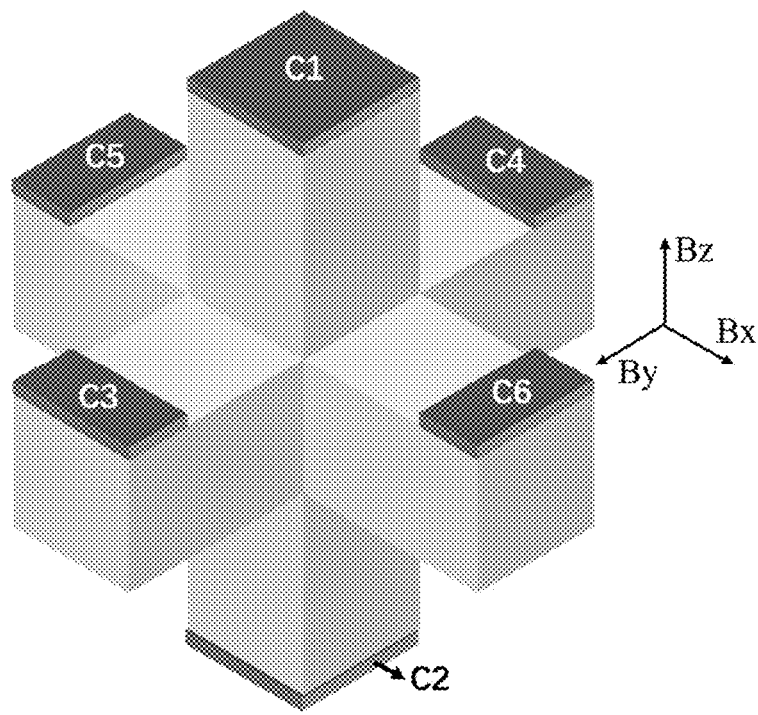
FIG. 1 is a schematic diagram of the structure of a novel three-dimensional cross-shaped high-temperature three-dimensional Hall sensor proposed by the present invention.

In order to achieve a small-sized three-dimensional Hall sensor with consistent performance in three dimensions, the present invention proposes a novel three-dimensional cross-shaped Hall sensor structure that can balance the requirements of small size and consistent performance in three dimensions. The schematic diagram of the device structure is shown in FIG. 1.

The device proposed in the present invention is made of third-generation semiconductor materials and, when observed from the front, side, and top, exhibits a cross-shaped structure, where the electrode shapes of C1 to C6 are not specifically limited. The detection of the magnetic field Bz perpendicular to this surface is accomplished through the planar cross-shaped structure where electrodes C3, C4, C5, and C6 are located. Electrodes C3 and C4 serve as excitation input terminals and can be stimulated using voltage or current. Electrodes C5 and C6 detect the output potential difference signal. Or, C5 and C6 can be used as excitation input terminals receiving voltage or current stimulation, with the potential difference signal detected between electrodes C3 and C4. When detecting the horizontal magnetic field, electrodes C1, C2, C5, and C6 are used to measure the magnitude of the magnetic field in the By direction. Electrodes C1 and C2 or C5 and C6 serve as excitation input terminals receiving voltage or current stimulation. The magnitude of the By magnetic field is measured by detecting the potential difference between C5 and C6 or between C1 and C2. Electrodes C1, C2, C3, and C4 are used to measure the magnitude of the magnetic field in the Bx direction. Electrodes C1 and C2 or C3 and C4 serve as excitation input terminals receiving voltage or current stimulation. The magnitude of the Bx magnetic field is measured by detecting the potential difference between C3 and C4 or between C1 and C2. Through the measurement methods described above, the Hall sensor proposed in the present invention can use a single device to detect the magnitude of the magnetic field in three directions. Furthermore, all three directions feature a cross-shaped structure, resulting in higher sensitivity and lower offset voltage. The sensitivity, temperature drift coefficient, and offset voltage in all three directions are essentially consistent when measuring the magnetic field.

Figure 2:
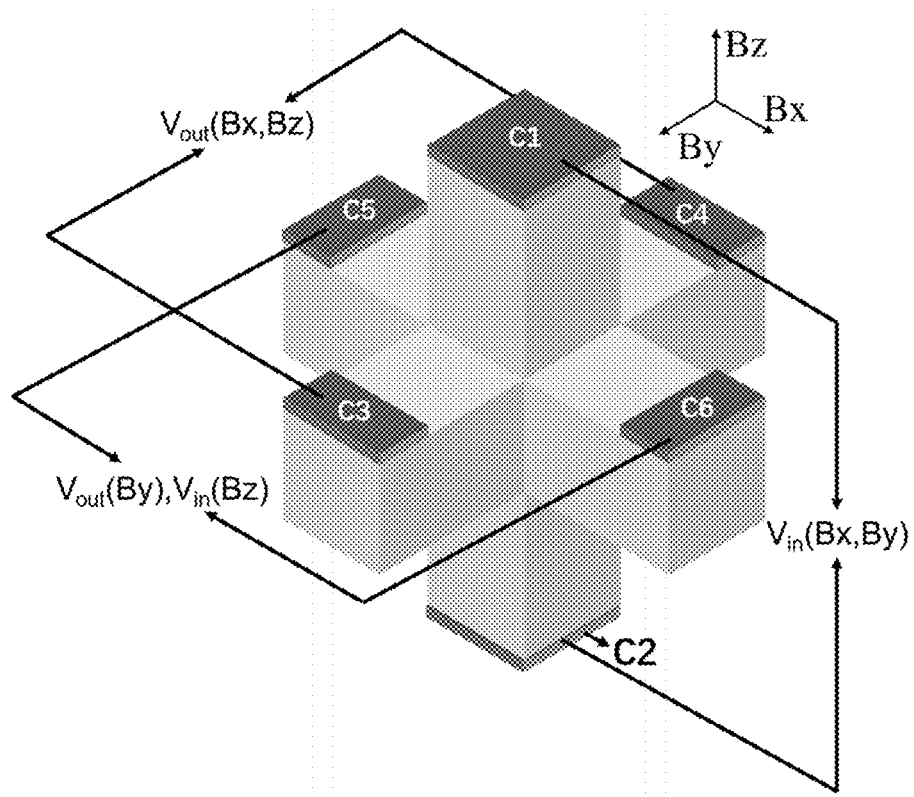
FIG. 2 is a three-dimensional measurement working principle diagram of the novel three-dimensional cross-shaped high-temperature three-dimensional Hall sensor proposed by the present invention.
Figure 3:
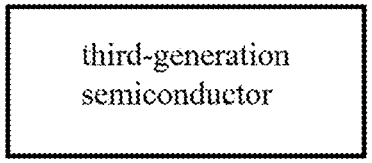
FIG. 3 is a schematic diagram of the process implementation of the present invention.
Figure 3:
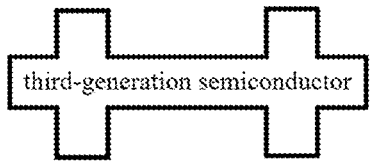
Figure 3:
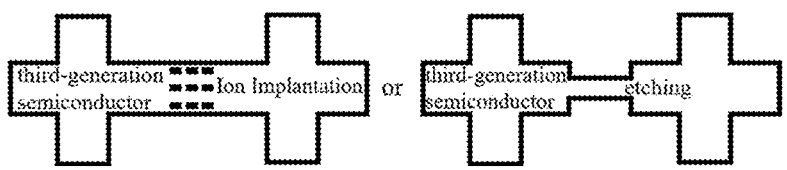
Figure 3:
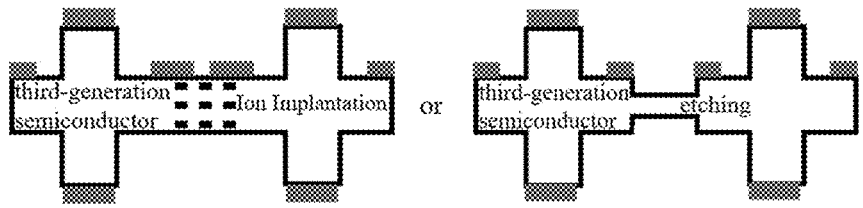
Figure 3:
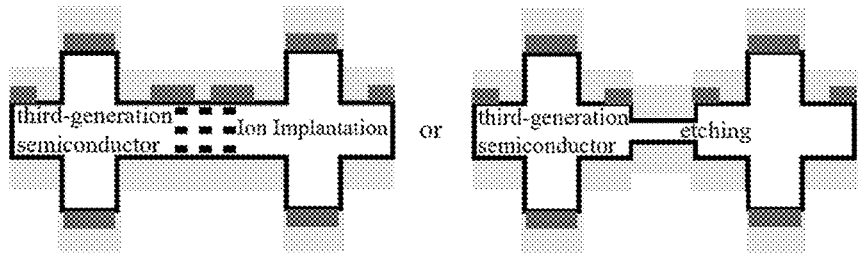
Figure 3:
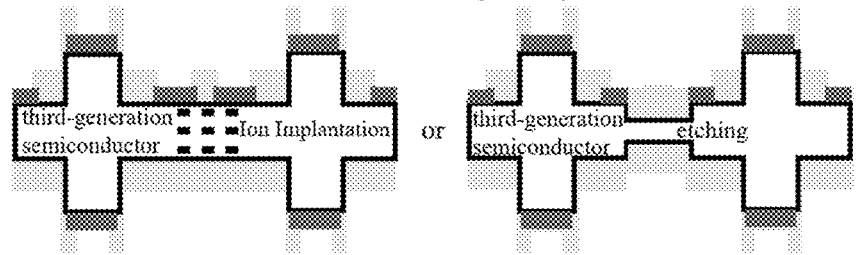

FIG. 2 illustrates the measurement working principle of the new three-dimensional cross-shaped high-temperature Hall sensor proposed in the present invention. In this diagram, the input and output ports can be exchanged when measuring the magnetic field in the X, Y, and Z directions. The figure depicts one of the measurement methods.

The manufacturing process the target device in the present invention is explained as follows:
1) Material preparation: Prepare third-generation semiconductor materials, clean the materials using acetone, ethanol, deionized water, hydrochloric acid, etc., to remove impurities on the surface of the materials.
2) Structural etching: After photolithography development, use Inductively Coupled Plasma (ICP) equipment to etch the third-generation semiconductor material. Both sides are etched to the same depth, preserving the electron active region.
3) Device isolation: After photolithography development, use plasma etching or ion implantation to create isolation in the device area.
4) Electrode fabrication: After photolithography development, deposit composite metals using an electron beam evaporation system. Utilize Rapid Thermal Annealing (RTA) to form good ohmic contacts on the surface of the third-generation semiconductor material.
5) Surface passivation: Deposit a dielectric layer for device passivation using one of the methods such as electron beam evaporation (EB), magnetron sputtering, Plasma-Enhanced Chemical Vapor Deposition (PECVD), Atomic Layer Deposition (ALD).
6) Window opening: After photolithography development, etch the passivation layer at the electrode locations to open windows. Use one of the methods such as magnetron sputtering, electron beam evaporation (EB), or thermal evaporation to deposit metal at the electrode locations and create pads for wire bonding.

Figure 4A:
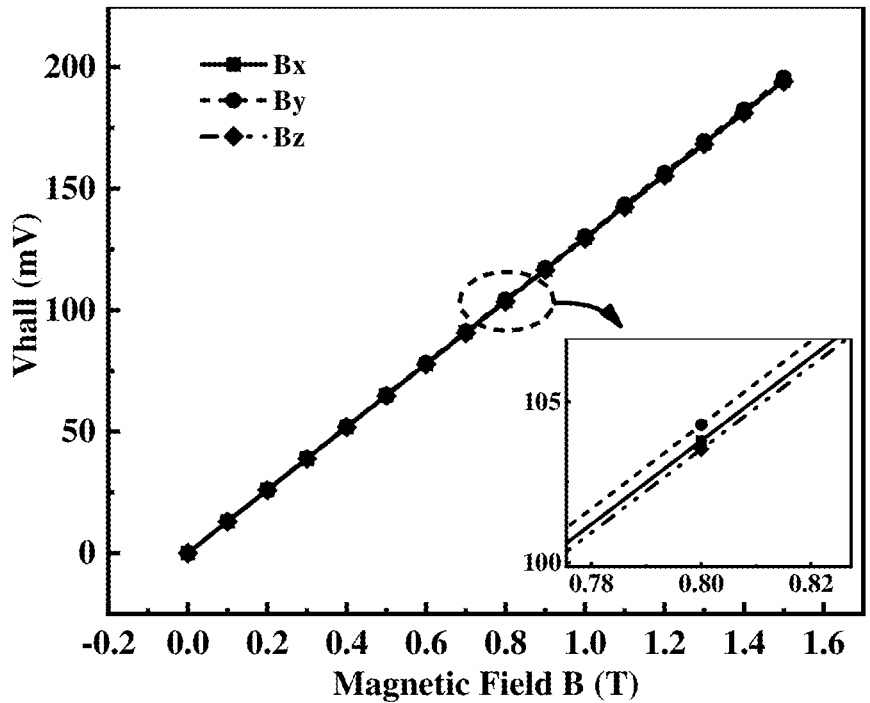
FIG. 4(a) is a diagram showing the relationship between the Hall voltage and magnetic field strength of the novel three-dimensional cross-shaped high-temperature three-dimensional Hall sensor proposed by the present invention.
Figure 4B:
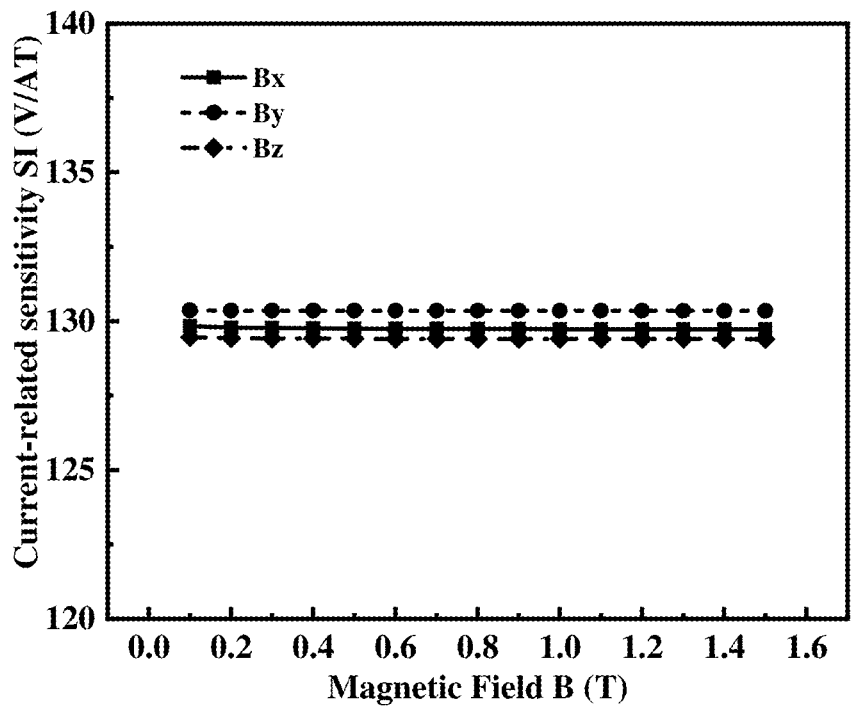
FIG. 4(b) is diagram showing the relationship between the current-related sensitivity and magnetic field strength of the novel three-dimensional cross-shaped high-temperature three-dimensional Hall sensor proposed by the present invention.

FIG. 4 illustrates the relationship between the Hall voltage, current-related sensitivity, and magnetic field when applying magnetic fields from the X, Y, and Z directions at room temperature for the Hall sensor designed in the present invention. From FIG. 4(a), it can be observed that the Hall voltage obtained when applying magnetic fields from the X, Y, and Z directions varies almost identically with the magnetic field intensity. The maximum difference across the full range is less than 1%, indicating excellent consistency in measurements for all three directions. This facilitates subsequent data processing and the measurement of three-dimensional magnetic fields. FIG. 4(b) shows that the current-related sensitivity is essentially consistent in all three directions, measuring 129.8 V/AT, 130.4 V/AT, and 129.4 V/AT, respectively.

Figure 5:
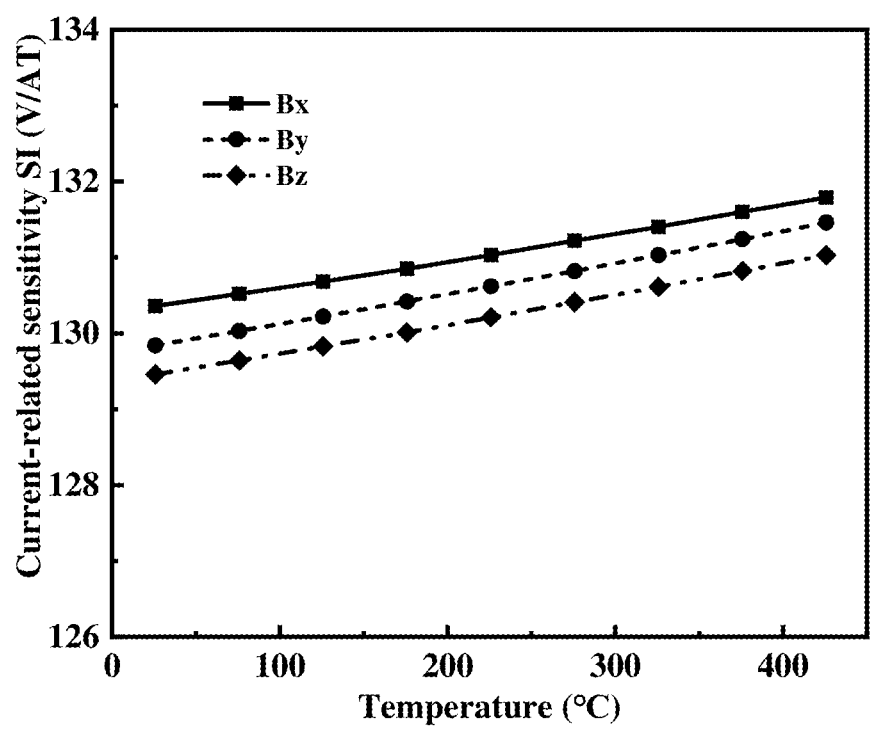
FIG. 5 is diagram showing simulation verification results of the current-related sensitivity and temperature relationship for the novel three-dimensional cross-shaped high-temperature three-dimensional Hall sensor proposed by the present invention.

FIG. 5 depicts the relationship between the current-related sensitivity and temperature when applying magnetic fields from the X, Y, and Z directions for the Hall sensor designed in the present invention. It can be observed that the temperature coefficients for all three directions are relatively small and essentially consistent, measuring 27.4 ppm/K, 31.2 ppm/K, and 30.3 ppm/K, respectively. This indicates that the testing performance of the sensor in all three directions remains consistent even at high temperatures, facilitating the measurement of three-dimensional magnetic fields under elevated temperature conditions.

The technological key points of the present invention lie in the improvement of the performance of the three-dimensional Hall sensor and the innovation in its structure.

The utilization of the novel three-dimensional cross-shaped structure significantly reduces the volume of the three-dimensional Hall sensor while ensuring consistent performance in measuring magnetic fields in all three directions and achieving high sensitivity. The use of third-generation semiconductor materials in the manufacturing process enables the sensor to operate in high-temperature environments. The designed sensor structure is simple, exhibits good and consistent performance in all directions, operates stably, and the device manufacturing process is straightforward. The main focus of this invention application is to protect the proposed device structure design and device manufacturing process.

The invention application provides the manufacturing process of the target device in two specific examples, as follows:

Example 1

1) Material Preparation: Prepare SiC material with an electron concentration of 1e15~1e18 $cm^{-3}$. Treat the material with hydrogen etching to smooth the surface. Clean the substrate using a chemical method with acetone, ethanol, deionized water to remove organic substances from the substrate surface. Use hydrochloric acid to remove surface oxides and metals, followed by rinsing with deionized water and drying with high-purity nitrogen.
2) Structure Etching: After coating and spin-coating the prepared sample, expose it under suitable light intensity, and then develop it. After exposure and development, a hard baking is applied. Using inductively coupled plasma etching equipment, etch SiC to the desired depth on both sides, preserving the electron-active region by etching the excess material.
3) Device Isolation: After photolithography development, etch a certain thickness outside the active area of the device using inductively coupled plasma equipment to achieve device isolation.
4) Electrode Fabrication: After photolithography development, use an electron beam evaporation system to deposit Ni (80 nm)/Ti (30 nm)/Al (80 nm) metal on the SiC surface. Then, utilize rapid thermal annealing (RTA) at 950° C. in a nitrogen environment for 6 minutes to form ohmic contacts. In this step, the photolithography precision of the two electrodes in the upper and lower columnar structures is critical. In the actual device manufacturing process, a margin of 2~5 μm is retained around the electrodes.
5) Surface Passivation: Use plasma-enhanced chemical vapor deposition (PECVD) to deposit a 100 nm thick $SiO_2$ passivation layer at 300° C. to mitigate the influence of the ambient atmosphere on device characteristics.
6) Window Opening: Etch the passivation layer at the electrode and open windows for lead-out. After photolithography development, use inductively coupled plasma etching to etch the electrode area after surface passivation, creating windows. Then, use magnetron sputtering to deposit 500 nm of Al at the electrode location, followed by lead-out to connect the electrode.

Example 2

1) Substrate Preparation: Prepare GaN material with an electron concentration of 1e16~1e18 $cm^{-3}$. Clean the substrate using a chemical method. Use acetone, ethanol, deionized water to remove organic substances from the substrate surface, use hydrochloric acid to remove surface oxides, metals, and then rinse with deionized water, and dry with high-purity nitrogen gas.

2) Surface Etching: The prepared sample is coated and spun-coated, exposed under suitable light intensity, and then developed. After exposure and development, a hard baking is applied, and an inductively coupled plasma etching device is used to etch GaN using Cl-based gas. Both sides are etched to the same depth, and excess material is removed while preserving the electron-active region.

3) Ion Implantation: After photolithography development, fluorine ions are injected into the non-device area or inductively coupled plasma etching is performed to achieve device isolation.

4) Electrode Fabrication: After photolithography development, Ti (30 nm)/Al (80 nm) metal is deposited on the surface of GaN using an electron beam evaporation system. Subsequently, rapid thermal annealing (RTA) is performed at 600° C. in a nitrogen atmosphere for 80s to form Ohmic contacts. Precision in the photolithography of the two electrodes in the upper and lower column structures is critical. In the actual device manufacturing process, a margin of 2~5 μm is left around the periphery of the electrodes.

5) Surface Passivation: $Si_3N_4$ passivation layer with a thickness of 100 nm is deposited using plasma-enhanced chemical vapor deposition (PECVD) at 300° ° C. to weaken the influence of the ambient atmosphere on the device characteristics.

6) Window Opening: The passivation layer at the electrode location is etched and windows are opened for lead wires. After photolithography development, ICP etching is used to etch the electrode location after surface passivation, forming windows. Subsequently, a 500 nm thick Al layer is deposited using magnetron sputtering, followed by lead wire bonding to extract the electrodes.

The above description is only the preferred embodiment of the present invention, and the scope of protection of the present invention is not limited thereto. Any person skilled in the art in the technical field to which the present invention belongs may make equivalent substitutions or changes based on the technical solutions and inventive concepts of the present invention disclosed within the technical scope of the present invention. Such substitutions or changes should be encompassed within the scope of protection of the present invention. The technical solution of the present invention, which uses third-generation wide-bandgap semiconductor materials, can also be extended to other semiconductors such as silicon, indium gallium telluride, gallium arsenide, gallium oxide, aluminum gallium nitride, and boron nitride. Within the approximate device structure category of the present solution, all should be encompassed within the scope of protection of the present invention.

The invention claimed is:

1. A cross-shaped high-temperature resistant three-dimensional Hall sensor, characterized by comprising: X-column, Y-column, Z-column, electrode C1, electrode C2, electrode C3, electrode C4, electrode C5, and electrode C6; the X-column, the Y-column, and the Z-column are all made of third-generation semiconductor materials, and the X-column, the Y-column, and the Z-column are vertically connected to each other; electrodes C1 and C2 are respectively set at both ends of the Z-column, electrodes C3 and C4 are set on both sides of the Y-column, and electrodes C5 and C6 are set on both sides of the X-column.

2. The cross-shaped high-temperature three-dimensional Hall sensor according to claim 1, wherein the X-column, the Y-column, and the Z-column form an integral molded structure.

3. The cross-shaped high-temperature three-dimensional Hall sensor according to claim 1, wherein the third-generation semiconductor materials is any one of gallium nitride, silicon carbide, zinc oxide, or diamond.

4. The cross-shaped high-temperature three-dimensional Hall sensor according to claim 1, wherein, detecting the magnetic field Bz perpendicular to this surface is detected through a plane cross-shaped structure where the electrodes C3, C4, C5, and C6 are located, electrodes C3 and C4 serve as excitation input terminals receiving input voltage or current excitation, and electrodes C5 and C6 detect output potential difference signals; or electrodes C5 and C6 can be used as excitation input terminals, receiving input voltage or current excitation, while electrodes C3 and C4 detect the output potential difference signal.

5. The cross-shaped high-temperature three-dimensional Hall sensor according to claim 1, wherein, when detecting the horizontal direction magnetic field, the magnitude of the By direction magnetic field is measured through the electrodes C1, C2, C5, and C6, electrodes C1, C2, or electrodes C5, C6 serve as excitation input terminals receiving input voltage or current excitation, and the magnitude of the By magnetic field is measured by detecting the potential difference between electrodes C5, C6, or electrodes C1, C2.

6. The cross-shaped high-temperature three-dimensional Hall sensor according to claim 1, wherein, the magnitude of the Bx direction magnetic field is measured through electrodes C1, C2, C3, and C4, electrodes C1, C2, or electrodes C3, C4 serve as excitation input terminals receiving input voltage or current excitation, and the magnitude of the Bx magnetic field is measured by detecting the potential difference between electrodes C3, C4, or electrodes C1, C2.

* * * * *